UNITED STATES PATENT OFFICE.

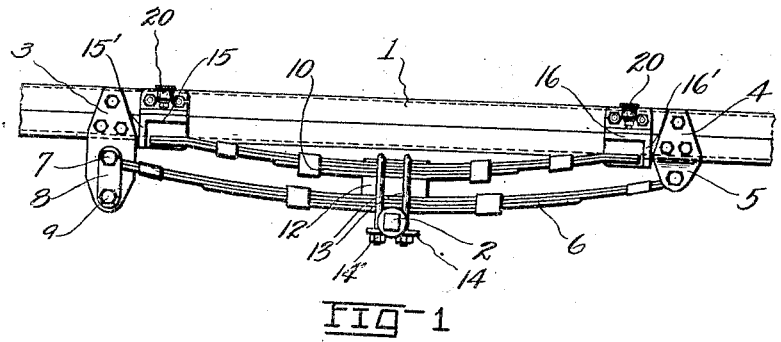
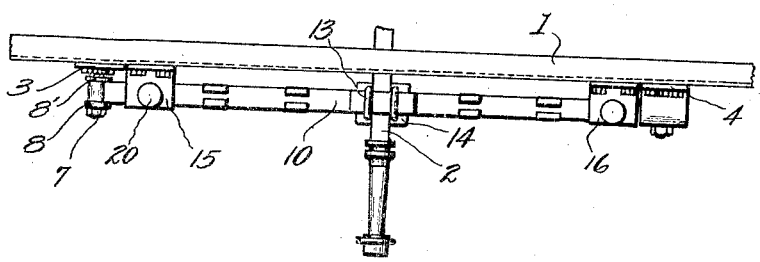
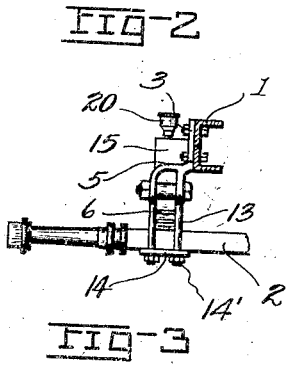

NELS E. LIEBERG, OF SEATTLE, WASHINGTON.

VEHICLE-SPRING 1,400,612. Specification of Letters Patent. Patented Dec. 20, 1921.

Application filed March 31, 1921. Serial No. 457,233.

*To all whom it may concern:*

Be it known that I, NELS E. LIEBERG, a citizen of the United States, and a resident of the city of Seattle, county of King, State of Washington, have invented certain new and useful Improvements in Vehicle-Springs, of which the following is a specification.

My invention relates to improvements in vehicle springs, and more particularly to springs of that character especially adapted for use on automobiles, touring cars, trucks and other wheeled vehicles, and has for its principal object to provide a spring device whereby great resiliency is afforded under a light load as well as under a heavy load, while at the same time strength and durability in the device are attained.

More specifically, it is the object of the invention to provide a vehicle spring comprising a lower spring section whereby normal loads on the vehicle may be supported, and an upper supplementary spring section which will come into play when loads greater than those normally carried, are placed on the vehicle.

Other objects of the invention reside in the details of construction of the various parts, and in the combination whereby an effective and efficient spring structure is provided.

In accomplishing these and other objects of the invention, I have provided the improved details of construction, the preferred forms of which are illustrated in the accompanying drawings, wherein—

Figure 1 is a side view of a spring structure constructed and mounted on a vehicle frame and axle according to the present invention.

Fig. 2 is a plan view of the same parts.

Fig. 3 is an end view of the spring and mounting members.

Referring more in detail to the several views of the drawings, wherein like reference numerals designate the same or like parts—

1 designates what may be the side rail, beam or frame member of a vehicle body, and 2 an axle whereon vehicle wheels may be mounted; the said axle being located transversely of the vehicle body and below the beam 1. Fixed to the beam 1, at points forwardly and rearwardly of the axle, are brackets 3 and 4, the latter of which has a lower end yoke portion 5 extended below the horizontal level of the beam 1, wherein one end of a vehicle spring 6 is pivotally fixed.

The spring consists of a plurality of superimposed leaves and is centrally mounted upon the axle 2 and extends parallel with the beam 1, and, at the end opposite that which is fixed in the bracket 4, it is pivotally mounted on a bolt 7 which extends between the upper ends of a pair of links 8—8', which in turn are pivotally mounted at their lower ends on a bolt 9 which extends outwardly from, and is rigidly fixed in the lower end of the bracket 3.

Under normal conditions, and normal load, this spring 6 will support the vehicle body, but as a supplement thereto for the support of additional or excessive loads, I have provided a spring 10 which is mounted in the same vertical plane of the spring 6 and is spaced therefrom by means of a block 12 that is placed between the springs directly above the axle 2. The two springs are held rigidly in position on the axle by means of a pair of U-bolts 13 which extend about the springs and along opposite sides of the axle, and through a base plate 14 against which nuts 14' threaded onto the bolts are tightened to draw the parts tightly together.

The upper spring 10 is somewhat shorter than the lower spring and is left free at its opposite ends, and these are adapted to move into and from engagement with abutment brackets 15 and 16 which are secured to the beam 1 just within the brackets 3 and 4.

The brackets 15 and 16 have horizontal flanges thereon forming downwardly facing shoulders for engaging the spring ends on direct downward movement of the vehicle body, and have vertical flanges or abutments 15'—16' against which the ends of the spring may abut to resist longitudinal movement beyond a certain degree.

Assuming that the spring is so constructed and mounted on a vehicle body as illustrated, it is apparent that while the vehicle is traveling under light load, the spring 6 will be sufficient to support the body and will permit of a certain desired resiliency that will add to the comfort of riding in the vehicle, and that when a load greater than normal is applied to the vehicle, the spring 10 becomes effective to prevent the jolt and jar usually noticeable when riding in a heavily loaded vehicle, or in one with springs that are not sufficiently strong.

Oil cups 20 are mounted on the brackets 15 and 16 for the purpose of lubricating the ends of the spring 10 to prevent wear from friction with the brackets.

It is also apparent that the spring device, so constructed, provides for the maximum resiliency under light or heavy loads and at the same time strength and durability are provided.

It is also noted that should the device be used on motor driven vehicles which employ driving chains at opposite sides of the vehicle, the upper spring will serve as a means of preventing damage should the lower spring break or become loose, as, in such cases, it drops into the brackets 15 and 16 and, in this manner, will retain the axle in position until the vehicle can be stopped and the damage repaired.

It is further apparent that such springs could be applied to various types of motor driven vehicles and would be very desirable on touring cars or trucks where the loads carried may sometimes be exceedingly light or heavy.

Having thus described my invention, what I claim as new therein and desire to secure by Letters Patent, is:

The combination with a vehicle body member having spring mounting brackets fixed in spaced relation thereon and an axle extended beneath said frame member between said brackets, of a normal load supporting spring centrally mounted on said axle and operatively connected at its ends with said brackets and a second load supporting spring centrally supported by the axle in the vertical plane of the first spring and above the same, with its opposite ends normally free, and brackets fixed to the body member overlying the free ends of the latter spring and having horizontal, downwardly facing shoulders for engaging the said free ends when said body is depressed by loads greater than normal and having vertical flanges engageably extending from said horizontal flanges for abutment by the ends of said second spring to prevent longitudinal movement of the body beyond a certain degree.

Signed at Seattle, Washington this 25th day of March 1921.

NELS E. LIEBERG